(12) United States Patent
Vaughn et al.

(10) Patent No.: US 10,409,974 B2
(45) Date of Patent: Sep. 10, 2019

(54) TECHNOLOGIES FOR AUTHORIZING A USER TO A PROTECTED SYSTEM

(71) Applicant: Intel Corporation, Santa Clara, CA (US)

(72) Inventors: Robert L. Vaughn, Portland, OR (US); Jeffrey C. Sedayao, San Jose, CA (US); Casey L. Baron, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 92 days.

(21) Appl. No.: 15/283,326

(22) Filed: Oct. 1, 2016

(65) Prior Publication Data

US 2018/0096116 A1   Apr. 5, 2018

(51) Int. Cl.
*G06F 21/00* (2013.01)
*G06F 21/34* (2013.01)
*G06F 21/31* (2013.01)

(52) U.S. Cl.
CPC ............ *G06F 21/34* (2013.01); *G06F 21/316* (2013.01)

(58) Field of Classification Search
None
See application file for complete search history.

(56) References Cited

U.S. PATENT DOCUMENTS

| | | | | |
|---|---|---|---|---|
| 7,813,822 B1 * | 10/2010 | Hoffberg | ............ | G06K 9/00369 381/73.1 |
| 7,966,497 B2 * | 6/2011 | Gantman | ............ | G06Q 20/3272 713/184 |
| 9,459,737 B2 * | 10/2016 | Woolley | .................. | G06F 3/044 |
| 9,747,768 B1 * | 8/2017 | Zehler | .............. | G06K 19/07758 |
| 2009/0109030 A1 * | 4/2009 | Do | ........................ | G06F 3/038 340/572.1 |
| 2012/0008769 A1 * | 1/2012 | Collins | .................. | H04L 9/3226 380/44 |
| 2014/0125574 A1 * | 5/2014 | Scavezze | ................ | G06F 21/31 345/156 |
| 2014/0331313 A1 * | 11/2014 | Kim | ........................ | G06F 21/32 726/16 |
| 2015/0363990 A1 * | 12/2015 | Truong | .................. | A44C 21/00 382/136 |
| 2016/0156473 A1 * | 6/2016 | Hewitt | .................. | H04L 9/3234 726/20 |
| 2017/0068806 A1 * | 3/2017 | Kisters | .................... | G10L 17/00 |
| 2017/0206273 A1 * | 7/2017 | Tannenbaum | .... | G06F 17/30778 |
| 2017/0286787 A1 * | 10/2017 | Tommy | .............. | G06K 9/00885 |

* cited by examiner

*Primary Examiner* — Shin-Hon (Eric) Chen

(74) *Attorney, Agent, or Firm* — Barnes & Thornburg LLP

(57) ABSTRACT

Technologies for user authorization include a compute device configured to determine one or more physical attributes of a non-electronic physical object and authorize a user to a protected system based on the determined physical attributes of the non-electronic physical object. The physical attributes may include, for example, an acoustic signature, a color signature, a shape signature, a weight signature, a position signature, or other physical attribute or set of physical attributes of the non-electronic physical object. The physical attributes may be sensed by various sensors of the compute device and compared to previously sensed or determined physical attributes to authorize the user to the protected system.

16 Claims, 7 Drawing Sheets

TECHNOLOGIES FOR AUTHORIZING A USER TO A PROTECTED SYSTEM

BACKGROUND

User authentication is used in compute systems to authorize a user to the compute system and/or a system or area protected by the compute system. Many present day user authentication/authorization technologies rely on the use of electronic user authentication. For example, digital keys, authentication tokens, biometric capture devices, and the like compare digital representations of security keys to confirm the authorization of the user.

Some authentication technologies that rely on digital security keys can be compromised by various means. For example, some digital authentication technologies rely on physical authenticator devices, such as Rivest-Shamir-Adleman (RSA) authenticator device, which can be lost or stolen. Additionally user passwords or passkeys can be cracked via brute force or informed force attacks. Other digital technologies can be circumvented by man-in-the-middle attacks and/or other cyberattack methodologies. In some ways, the mere public knowledge of the presence of a user authentication/security system or infrastructure can reduce the overall effectiveness of the system by providing forewarning to a would-be attacker.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
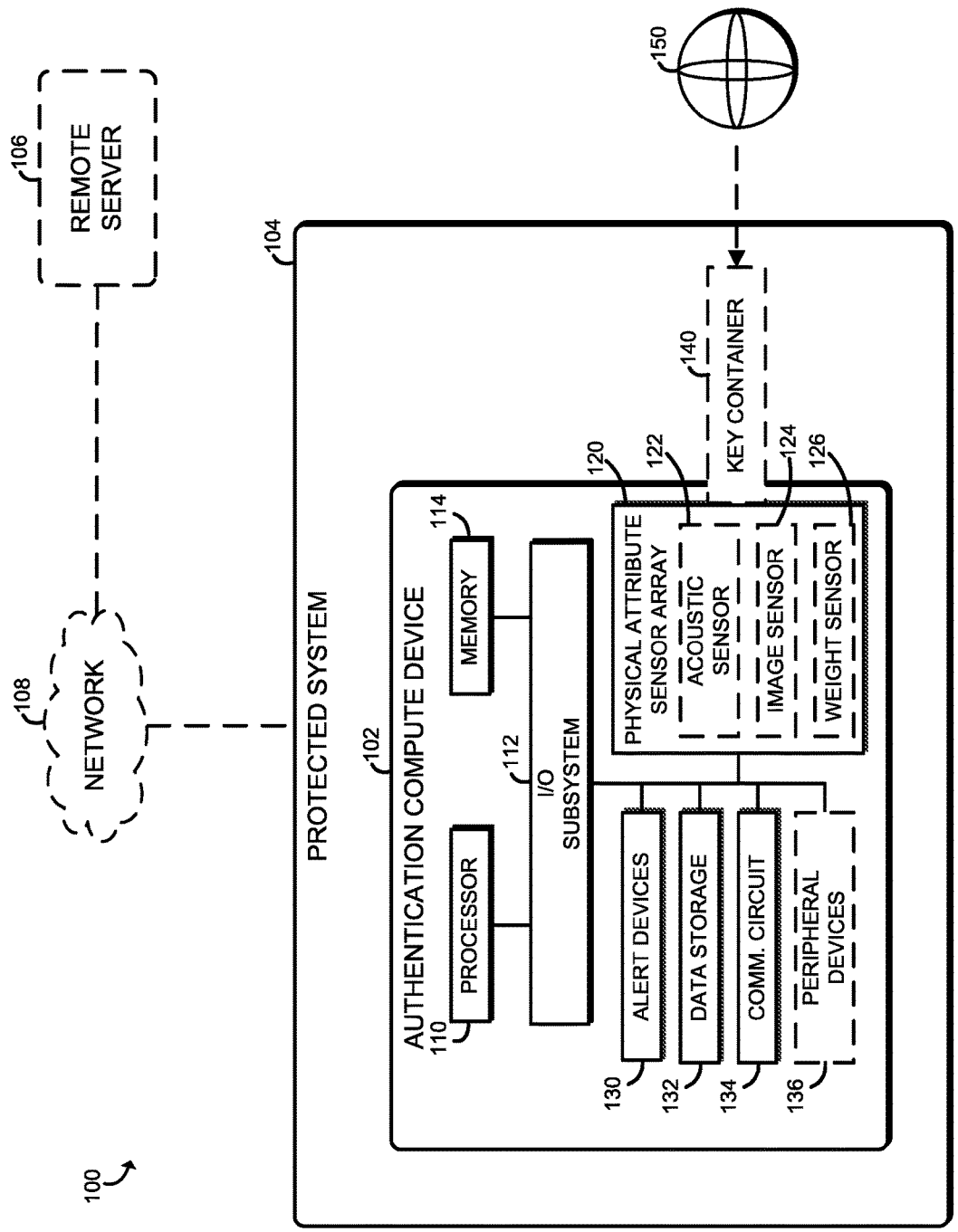
FIG. 1 is a simplified block diagram of at least one embodiment of a system for user authorization for a protected system.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for authorization of a user to a protected system 104 includes an authentication compute device 102 configured to authorize the user based on authentication of a non-electronic physical object 150 provided by the user. As discussed in more detail below, the non-electronic physical object 150 acts as a physical security key to the authentication compute device 102. To authenticate the non-electronic physical object 150, the authentication compute device 102 is configured to sense, or otherwise determine, one or more physical attributes of the non-electronic physical object 150. Such physical attributes may include any physical aspect or characteristic of the non-electronic physical object 150 that may be sensed or otherwise determined by the authentication compute device 102. For example, depending on the type of non-electronic physical object used, the physical attribute(s) may include the sound the non-electronic physical object 150 makes (e.g., the unique ticking sound of a mechanical watch), the color or combination of colors of the non-electronic physical object 150 (e.g., the colors of a multi-color pattern on the toy), the shape of the non-electronic physical object 150 (e.g., the geometrical shape of a rock), the weight of the non-electronic physical object 150 (e.g., the weight of a pen), the present positioning or configuration of the electronic physical object 150 (e.g., whether a watch a placed face down or face up), and/or other physical attributes of the non-electronic physical object 150. Of course, in some embodiments, multiple physical attributes of the non-electronic physical object 150 may be used to properly authenticate the object 150 (e.g., both the sound the object 150 makes and the coloring of the object 150).

After the authentication compute device 102 determines the relevant physical attributes of the non-electronic physical object 150, the authentication compute device 102 creates a physical attribute signature for the non-electronic physical object 150 based on the one or more determined physical attributes. The physical attribute signature may be embodied as, or otherwise be indicative of, the collection or set of determined physical attributes. Once determined, the authentication compute device 102 compares the physical attribute signature to a previously determined and stored authentication signature of the non-electronic physical object 150. If the physical attribute signature and the authentication signature match, the authentication compute device 102 performs an authentication action, which may include authorizing the user to access the protected system 104 (e.g., a motor vehicle) or other action. In some embodiments, as discussed in more detail below, the particular authentication action performed by the authentication compute device 102 may be dependent on the particular set of sensed or determined physical attributes. In such embodiments, a single non-electronic physical object 150 may be used to provide multiple levels or tiers of authorization (e.g., by repositioning or reconfiguring the object 150).

The non-electronic physical object 150 may be embodied as any type of non-electronic object or device capable of being carried by the user (e.g., in the user's pocket or otherwise on the user's person) such as a mechanical watch, pen, mechanical toy, collectible memorabilia, rock, and/or other non-electronic object or device. For example, in some embodiments, the non-electronic physical object 150 may be embodied as an object of personal value to the user, such that the user will typically carry the object on her/his person. As discussed above, the non-electronic physical object 150 is used as a security key to authorize the user to the protected system 104. However, because the physical object 150 is not an electronic device, a malicious attacker of the protected system 104 may not even comprehend that the non-electronic physical object 150 is, in fact, a security "key" for the protected system 104. For example, a user of the authentication compute device 102 may use a small, plastic figurine as the non-electronic physical object 150. To non-authorized individuals, the plastic figurine may be incorrectly interpreted as a simple plastic toy, not a security key, thereby providing an additional aspect of protection to the protected system 104.

Additionally, the use of the non-electronic physical object 150 as a security key may provide further security by not requiring any digital communication, whether wired or wireless, between the object 150 and the authentication compute device 102 to authorize the user to the protected system 104. Such digital communications, even when encrypted, may be intercepted or otherwise compromised in some cases. However, the physical object 150 still includes unique or semi-unique physical attributes or characteristics, which may be sensed or determined by the authentication compute device 102 and utilized as an authentication signature of the non-electronic physical object 150. For example, in the case in which the non-electronic physical object 150 is embodied as a mechanical watch, the mechanical watch may produce an acoustic signature (e.g., the particular ticking sound the watch makes) that is unique to that particular mechanical watch, even when compared to other watches of the same make and model. That is, by increasing the granularity of the sensed physical attribute (e.g., increasing the definition at which the sound of the mechanical watch is analyzed), a unique or semi-unique physical attribute can be sensed even among objects of the same type, make, model, etc. Of course, additional and/or other physical attributes may be used in other embodiments. For example, a color signature, shape signature, weight signature, position or configuration signature, and/or other physical attribute signature of the non-electronic physical object 150 may be used alone or in combination with each other to authenticate the non-electronic physical object 150 as discussed in more detail below.

In some embodiments, the non-electronic physical object 150 may be manufactured to include different physical attributes relative to other physical objects of the same type, make, and/or model. For example, in the case in which the non-electronic physical object 150 is embodied as a mechanical watch, each mechanical watch of the same make and model may be manufactured with minor variances or differences (e.g., spring tension, gear ratio, etc.) that, while not affecting performance to an appreciable or noticeable degree, results in an acoustic signature that can be differentiated from other mechanical watches of the same type, make, and/or model.

The authentication compute device 102 may be embodied as any type of compute device capable of authorizing a user based on authentication of the non-electronic physical object 150. For example, in some embodiments, the authentication compute device 102 may be embodied as a security compute device such as an alarm system, an in-vehicle security system, a house security system, a safe security compute device, or other computer or compute device. As shown in FIG. 1, the illustrative authentication compute device 102 includes a processor 110, an input/output ("I/O") subsystem 112, a memory 114, a physical attribute sensor array 120, one or more alert devices 130, a data storage 132, and a communication circuit 134. Of course, the authentication compute device 102 may include other or additional components, such as those commonly found in a typical compute device, in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the authentication compute device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the authentication compute device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the authentication compute device 102, on a single integrated circuit chip.

The physical attribute sensor array 120 may include, or otherwise be embodied as, one or more physical attribute sensors configured to sense corresponding physical attributes of the non-electronic physical object 150. Each physical attribute sensor of the physical attribute sensor array 120 may be embodied as any type of sensor capable of sensing, measuring, or otherwise producing sensor data indicative of a physical attribute of the non-electronic physical object 150. For example, the physical attribute sensor array 120 may include one or more acoustic sensors 122, one or more image sensors 124, one or more weight sensors 126, and/or additional or other sensors. Of course, the specific types and number of sensors included in the physical attribute sensor array 120 may depend on the particular physical attributes of the non-electronic physical object 150 to be sensed or determined. Additionally, the physical attribute sensor array 120 may include sensors that are not used in all authentication procedures (e.g., sensors configured to measure a physical attribute not used with a particular non-electronic physical object 150).

The alert devices 130 may be embodied as any type of device, circuit, or component capable of generating an alert to a user of the authentication compute device 102. For example, the alert devices 130 may include an audible alert device, a visible alert device, a tactile alert device, and/or other alert indicator. In some embodiments, the alert devices 130 may be embodied as, or otherwise, include a display to provide information to the user of the authentication compute device.

The data storage 132 may be embodied as any type of device or devices configured for short-term or long-term storage of data such as, for example, memory devices and circuits, memory cards, hard disk drives, solid-state drives, or other data storage devices. In the illustrative embodiment, the authentication compute device 102 may be configured to store authentication signatures in the data storage. As discussed in more detail below, the authentication signatures are based on previously determined or sensed physical attributes of the non-electronic physical object 150 and are used to authenticate an offered physical object.

The communication circuit 134 may be embodied as any type of communication circuit, device, or collection thereof, capable of enabling communications between the authentication compute device 102 and other devices (e.g., the remote server 106 discussed below). To do so, the communication circuit 134 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

In some embodiments, the authentication compute device 102 may also include one or more peripheral devices 136. The peripheral devices 136 may include any number of additional peripheral or interface devices, such as other input/output devices, storage devices, and so forth. The particular devices included in the peripheral devices 136 may depend on, for example, the type and/or configuration of the authentication compute device 102 and/or the protected system 104.

The protected system 104 may be embodied as any type of device or system to which access is protectable via the authentication compute device 102. In some embodiments, the protected system 104 may be embodied as a non-electronic device, access to which is protected by the authentication compute device 102. For example, in such embodiments, the protected system 104 may be embodied as a physical safe, locked drawer, container, or the like. In other embodiments, the protected system 104 may include other electrical components, compute devices, and/or systems. In such embodiments, the authentication compute device 102 controls access to one or more of the electronic devices, components, or systems of the protected system 104. For example, in the illustrative embodiment, the protected system 104 is embodied as a motor vehicle, and the authentication compute device 102 is configured to authorize a user of the motor vehicle based on authentication of the non-electronic physical object 150. As discussed below, such authorization may be multi-tiered based on different physical attributes of the non-electronic physical object 150 (e.g., access to the interior of the motor vehicle and powering of the vehicle may be separately protected based on the present configuration of the non-electronic physical object 150).

Figure 2:
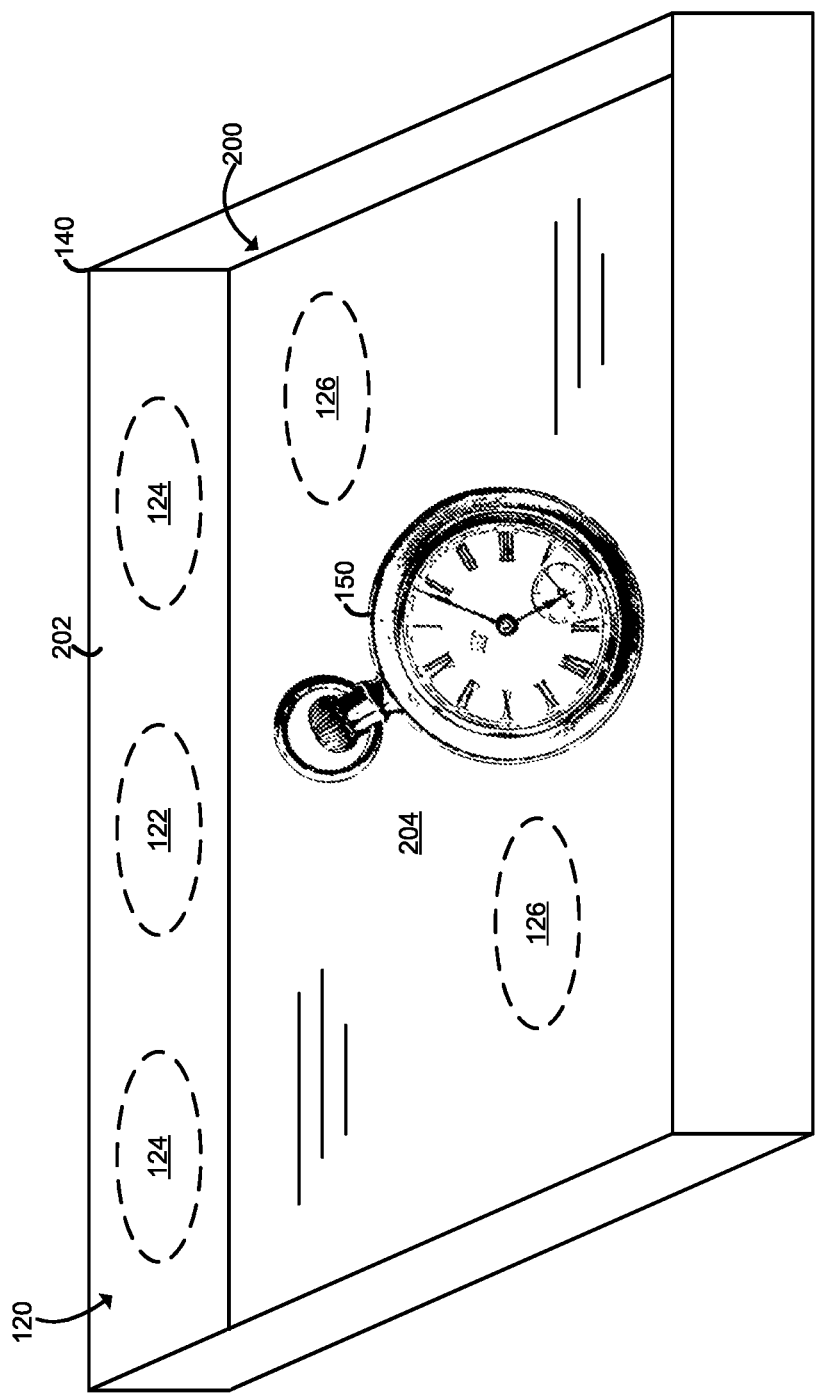
FIG. 2 is a simplified illustration of a key container of an authentication compute device of the system of FIG. 2.

In some embodiments, the authentication compute device 102 and/or the protected system 104 may also include a key container 140. The key container 140 may be embodied as any type of physical container capable of holding or receiving the non-electronic physical object 150, such as a cup, drawer, glove box, panel, or the like. One illustrative embodiment of a key container 140 is shown in FIG. 2. The illustrative key container 140 is embodied as an open-lid container or cup having an interior chamber 200 sized such that the non-electronic physical object 150 can be placed into the key container 140. The key container 140 also includes an illustrative physical attribute sensor array 120 embodied as several sensors coupled to or embedded in corresponding walls of the key container 140. For example, in the illustrative embodiment, the key container 140 includes a pair of image sensors 124 and an acoustic sensor 122 embedded in a sidewall 202. Additionally, the illustrative key container 140 includes a pair of weight sensors 126 embedded in a bottom wall 204.

In the illustrative embodiment of FIG. 2, the authentication compute device 102 utilizes the various sensors of the physical attribute sensor array 120 to sense or determine corresponding physical attributes of the non-electronic physical object 150 (illustratively shown as a mechanical watch). For example, the image sensors 124 may sense the shape, coloring, and/or positioning within the interior chamber 200 of the non-electronic physical object 150. Similarly, the acoustic sensor 122 may sense the acoustics produced by the non-electronic physical object 150 (e.g., the particular "ticking" of the mechanical watch). Additionally, the weight sensors 126 may sense the weight of the non-electronic physical object 150. All or only some of the sensed physical attributes of the non-electronic physical object 150 may be used to authenticate the non-electronic physical object 150 by comparing the sensed physical attributes to an authentication signature associated with the non-electronic physical object 150. As discussed in more detail below, the authentication signature includes, or is otherwise indicative of, previously sensed or determined corresponding physical attributes of the authenticated non-electronic physical object 150.

Referring back to FIG. 1, in some embodiments, the authentication compute device 102 may be configured to communicate with a remote server 106 via a network 108 to register and validate authentication signatures of a new non-electronic physical object 150 as discussed in more detail below. In such embodiments, the remote server 106 may receive a newly generated authentication signature and verify that the authentication signature has not been previously registered. That is, the remote server 106 may be configured to verify that the non-electronic physical object 150 (or a particular set of physical attributes of the same non-electronic physical object 150) has not been previously used as a security key for the authentication compute device 102 and/or other authentication compute devices. Additionally or alternatively, in some embodiments, some of the authentication procedures discussed below as being executed by the authentication compute device 102 may be instead performed by the remote server 106.

The remote server 106 may be embodied as any type of computation or computer device capable of performing the functions described herein including, without limitation, a server, a computer, a multiprocessor system, a rack-mounted server, a blade server, a laptop computer, a notebook computer, a tablet computer, a wearable computing device, a network appliance, a web appliance, a distributed computing system, a processor-based system, and/or a consumer electronic device. As such, the remote server 106 may include components commonly found in a server compute device such as processors, memory, I/O subsystems, communication circuits, and/or other devices. The description of such components of the remote server 106 is similar to the corresponding components of the authentication compute device 102 and it not repeated herein for clarity of the description. It should be appreciated that the remote server 106 may be embodied as a single compute device or a collection of distributed compute devices.

The network 108 may be embodied as any type of network capable of facilitating communications between the authentication compute device 102 and the remote server 106. For example, the network 108 may be embodied as, or otherwise include, a wireless local area network (LAN), a wireless wide area network (WAN), a cellular network, and/or a publicly-accessible, global network such as the Internet. As such, the network 108 may include any number of additional devices, such as additional computers, routers, and switches, to facilitate communications thereacross.

Figure 3:
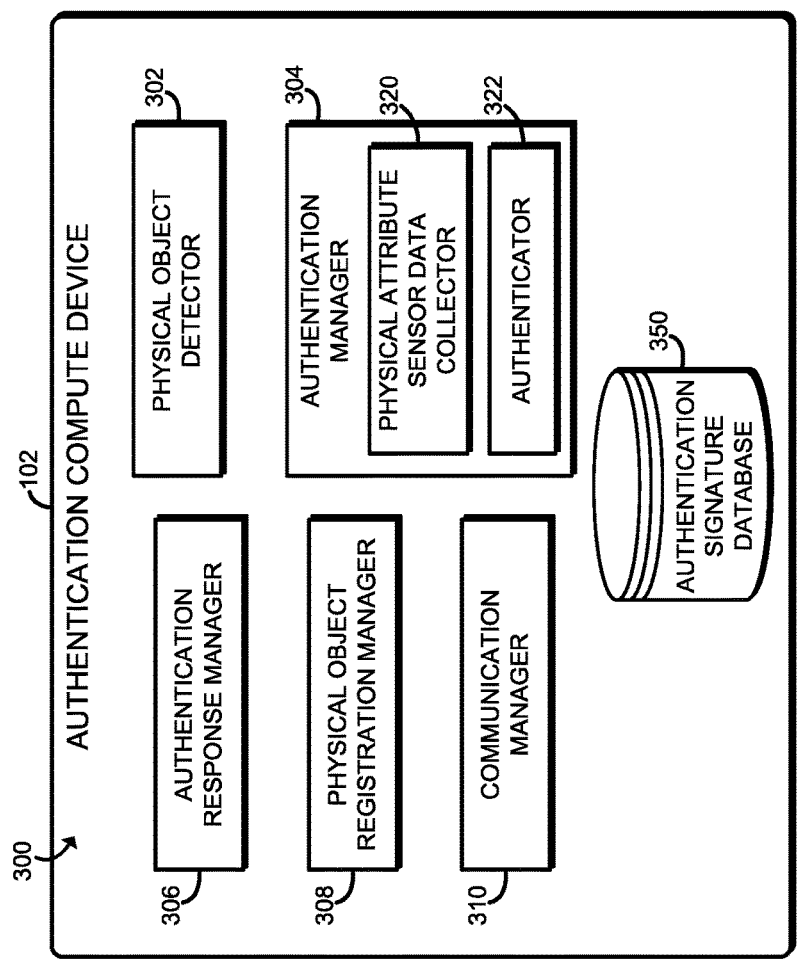
FIG. 3 is a simplified block diagram of at least one embodiment of an environment that may be established by the authentication compute device of the system of FIG. 1.

Referring now to FIG. 3, in the illustrative embodiment, the authentication compute device 102 may establish an environment 300 during operation. The illustrative environment 300 includes a physical object detector 302, an authentication manager 304, an authentication response manager 306, a physical object registration manager 308, and a communication manager 310. The various components of the environment 300 may be embodied as hardware, firmware, software, or a combination thereof. As such, in some embodiments, one or more of the components of the environment 300 may be embodied as circuitry or collection of electrical devices (e.g., a physical object detector circuit 302, an authentication manager circuit 304, an authentication response manager circuit 306, a physical object registration manager circuit 308, etc.). It should be appreciated that, in such embodiments, one or more of the physical object detector circuit 302, the authentication manager circuit 304, the authentication response manager circuit 306, and/or the physical object registration manager circuit 308 may form a portion of one or more of the processor 110, the I/O subsystem 112, the communication circuit 134, and/or other components of the authentication compute device 102. Additionally, in some embodiments, one or more of the illustrative components of the environment 300 may form a portion of another component and/or one or more of the illustrative components may be independent of one another.

Further, in some embodiments, one or more of the components of the environment 300 may be embodied as virtualized hardware components or emulated architecture, which may be established and maintained by the processor 110 or other components of the authentication compute device 102.

The physical object detector 302 is configured to monitor for and detect the presence of the non-electronic physical object 150 in the vicinity of the authentication compute device 102. To do so, the physical object detector 302 may utilize any sensor data indicative of the presence of the non-electronic physical object 150 including, for example, motion data, weight data, image data, and/or the like. In some embodiments, the physical object detector 302 may monitor one or more physical attribute sensors of the physical attribute sensor array 120 to detect the presence of the non-electronic physical object 150. In other embodiments, specialized or independent detection sensors may be used to detect the physical presence of the non-electronic physical object 150. In those embodiments in which the authentication compute device 102 and/or protected system 104 includes the key container 140, the physical object detector 302 may be configured to monitor for the presence of the non-electronic physical object 150 in the key container 140.

The authentication manager 304 is configured to manage the authentication of the non-electronic physical object 150. To do so, the authentication manager 304 includes a physical attribute sensor data collector 320 and an authenticator 322. The physical attribute sensor data collector 320 is configured to collect the various physical attribute sensor data generated or otherwise produced by the physical attribute sensors of the physical attribute sensor array 120. In some embodiments, the physical attribute sensor data collector 320 may process the sensor data (e.g., by applying various filters or the like) and/or aggregate the sensor data from multiple physical attribute sensors.

The authenticator 322 is configured to authenticate the non-electronic physical object 150 based on the physical attribute sensor data collected by the physical attribute sensor data collector 320. To do so, the authenticator 322 may generated or produce a physical attribute signature of the non-electronic physical object 150 based on the physical attributes detected or determined by the physical attribute sensor data collector 320. The physical attribute signature may be embodied as, or otherwise be indicative of, the individual sensed physical attributes. For example, in embodiments in which multiple, different physical attributes of the non-electronic physical object 150 are sensed (e.g., acoustics, coloring, and weight), the physical attribute signature may define or be indicative of each of those different physical attributes.

To authenticate the non-electronic physical object 150, the authenticator 322 compares the determined physical attribute signature to an authentication signature of the non-electronic physical object 150. Similar to the physical attribute signature, the authentication signature is embodied as, or otherwise indicative of, physical attributes of the non-electronic physical object 150 that were previously sensed or determined during a registration process as discussed below. If the authenticator 322 determines the physical attribute signature matches (e.g., is equal to within an allowable range of error) the authentication signature, the authenticator 322 authorizes the user to the protected system 104. The authentication signature may be stored in an authentication signature database 350. Additionally, multiple authentication signatures may be stored in the authentication signature database 350 and compared to the determined physical attribute signature to provide multi-tiered authorization to the user. The authentication signature database 350 may be locally stored on the authentication compute device 102 as shown in FIG. 3 or, in other embodiments, stored on the remote server 106 and/or other remote computer (e.g., stored in the "cloud"). In the latter embodiments, the authentication compute device 102 may access the authentication signature database 350 via the network 108 to authenticate the physical attribute signature and/or transmit the physical attribute signature to the remote server 106 or other remote device for remote authentication.

The authentication response manager 306 is configured to perform one or more authentication actions in response to the authenticator 322 successfully authenticating the non-electronic physical object 150 based on the authentication signature. The authentication action performed by the authentication response manager 306 may be embodied as any type of action or response related to the protected system 104. For example, in embodiments in which the protected system 104 is embodied as a motor vehicle, the authentication action may be to provide access to the interior of the vehicle (e.g., by unlocking a door), to allow ignition of the vehicle, to allow access to particular sub-systems of the vehicle (e.g., to a navigation system or an entertainment system), and/or other vehicle access. In some embodiments, the authentication action may not be directly related to the protected system 104. For example, in some embodiments, the authentication action may include transmitting a signal to the remote server 106, producing an alert, and/or other action unrelated to the protected system 104. Additionally, in some embodiments, the authentication response manager 306 may perform multiple authentication actions in response to a single successful authentication of the non-electronic physical object 150.

The physical object registration manager 308 is configured to register a new non-electronic physical object 150 to the authentication compute device 102 and the system 100. To do so, the authentication manager 304 senses or determines the physical attributes of the new non-electronic physical object 150 and produces or generates a physical attribute signature as discussed above. The particular physical attributes of the new non-electronic physical object 150 that are to be used in the authentication of the object 150 may be based on the particular physical attribute sensors of the physical attribute sensor array 120 and/or defined or selected by the user. Regardless, during the registration procedure, the authentication manager 304 provides the determined physical attribute signature to the physical object registration manager 308. The physical object registration manager 308 utilizes the communication manager 310 to transmit the physical attribute signature to the remote server 106 via the network 108. The remote server 106 verifies that the physical attribute signature has not been previously used by other users and/or by that particular user. That is, the remote server 106 compares the particular physical attribute sensor data embodied as the physical attribute signature to corresponding sensor data of other physical attribute signatures to ensure no duplicate is present. By comparing the physical attribute signature to previously registered signatures, the remote server 106 may verify that the new non-electronic physical object 150 has not been stolen or lost and is capable of being used as a unique or semi-unique security key.

Figure 4:
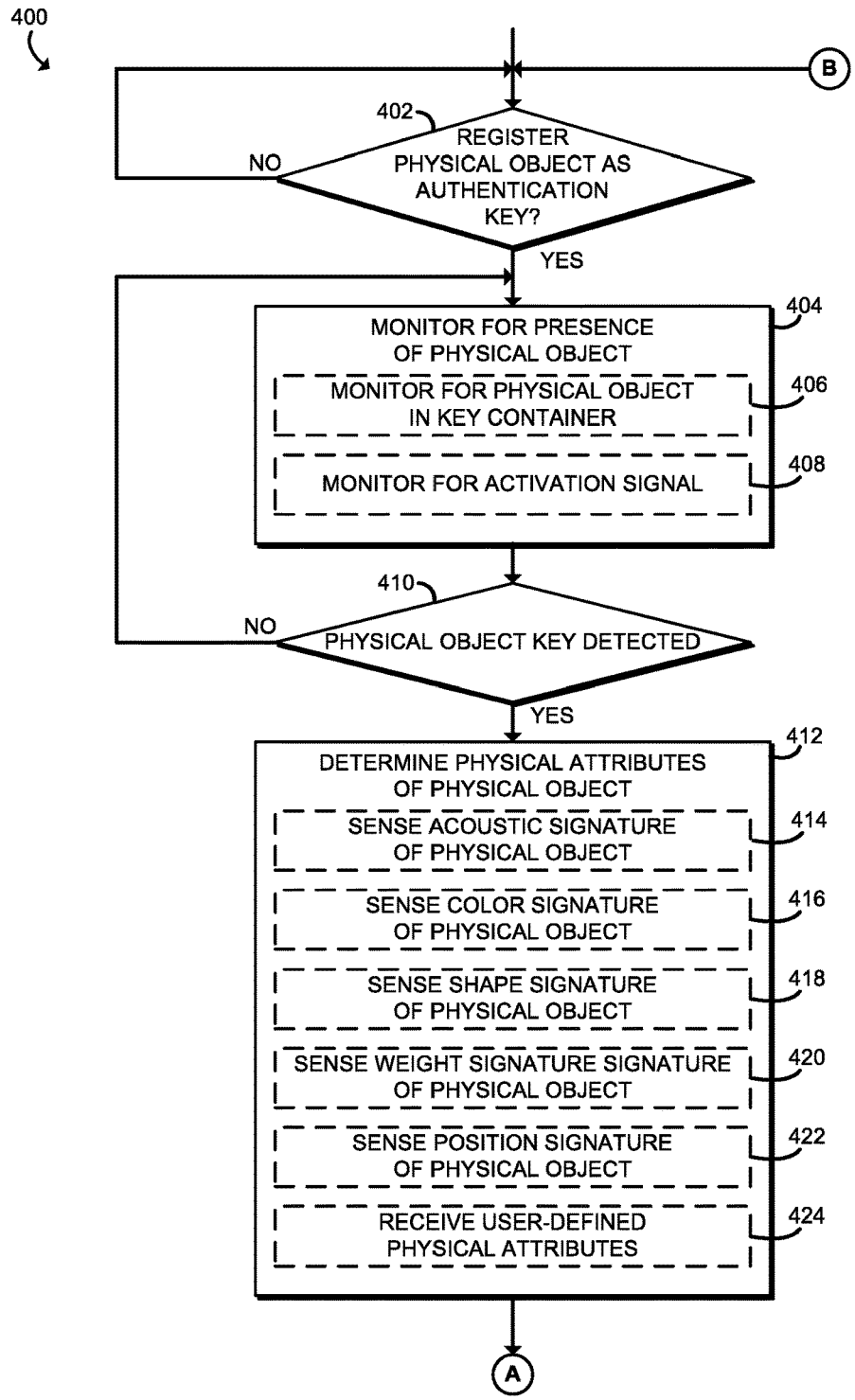
FIGS. 4-5 is a simplified flow diagram of at least one embodiment of a method for registering a non-electronic physical object as an security key that may be executed by the authentication compute device of FIGS. 1 and 3.
Figure 5:
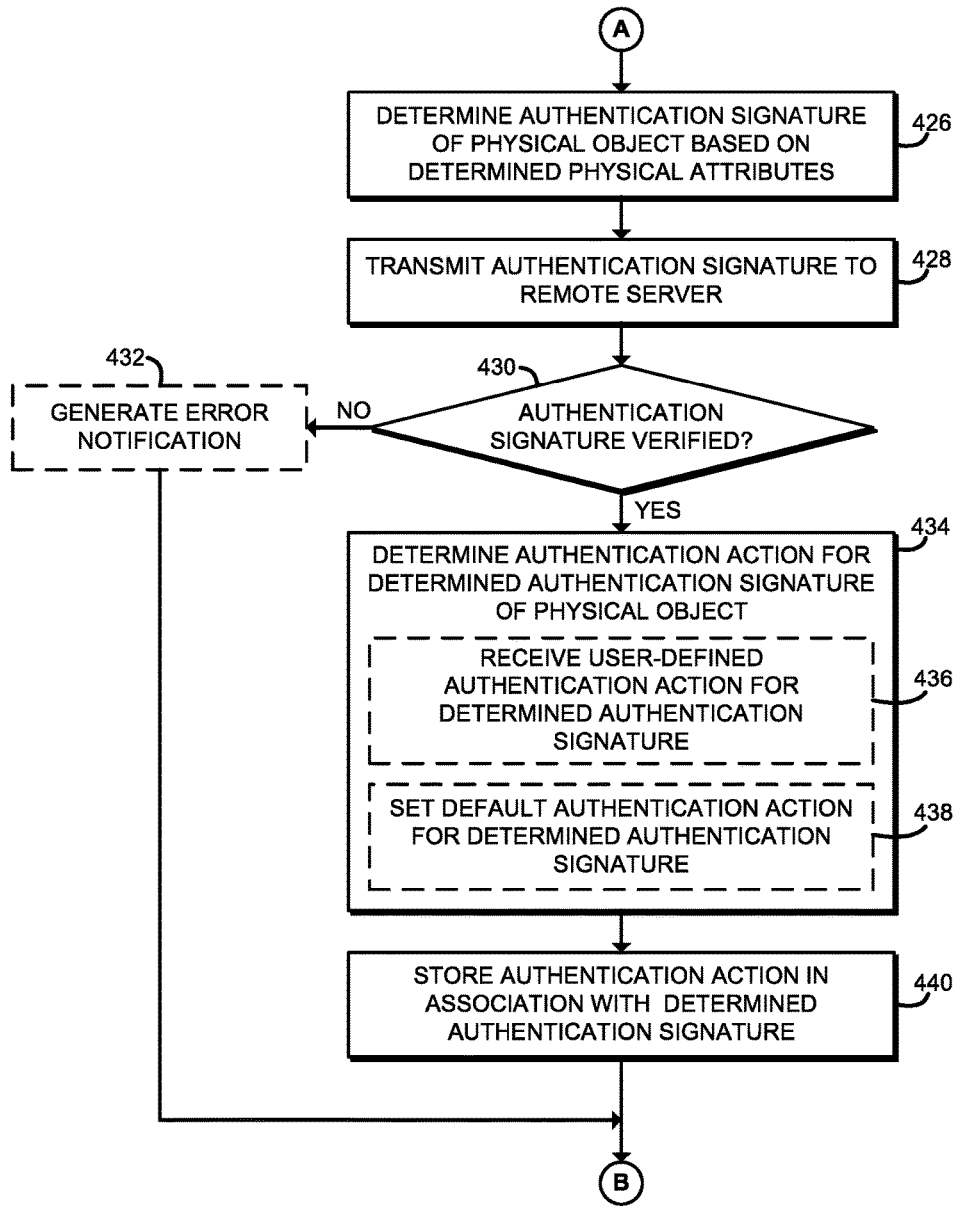

Referring now to FIGS. 4 and 5, in use, the authentication compute device 102 may execute a method 400 for registering a non-electronic physical object 150 as a security key. The method 400 begins with block 402 in which the authentication compute device 102 determines whether the user desires to register a new non-electronic physical object 150. To do so, in some embodiments, the user may provide an indication to the authentication compute device 102 that registration is desired. For example, the user may select an appropriate hardware or software button or widget to indicate a desire to register a new non-electronic physical object 150.

If the authentication compute device 102 determines that registration is desired, the method 400 advances to block 404. In block 404, the authentication compute device 102 monitors for the presence of the physical object 150 in the local vicinity. To do so, the authentication compute device 102 may monitor sensor data produced from one or more physical attribute sensors of the physical attribute sensor array 120 and/or from dedicated presence sensors (e.g., motion sensors, image sensors, etc.). In embodiments in which the authentication compute device 102 and/or the protected system 104 includes the key container 140, the authentication compute device 102 may monitor for the presence of the non-electronic physical object 150 in the key container 140 in block 406. As discussed above, the key container 140 may include one or more physical attribute sensors of the physical attribute sensor array 120 and/or dedicated presence sensors to facilitate the detection of the presence of the non-electronic physical object 150 in the key container 140. Additionally or alternatively, in block 408, the authentication compute device 102 may monitor for an activation signal that indicates the non-electronic physical object 150 is within the local vicinity (e.g., within the key container 140). In such embodiments, the authentication compute device 102 may rely solely on the activation signal as an indication of the presence of the non-electronic physical object 150 or utilize the activation signal in addition to other sense data indicative of such presence.

In block 410, the authentication compute device 102 determines whether the non-electronic physical object 150 was detected. If not, the method 400 loops back to block 404 in which the authentication compute device 102 continues to monitor for the presence of the new non-electronic physical object 150. If, however, the authentication compute device 102 successfully detected the new non-electronic physical object 150, the method 400 advances to block 412. In block 412, the authentication compute device 102 determines the physical attributes of the non-electronic physical object 150. As discuss in more detail below, the sensed or determined physical attributes of the non-electronic physical object 150 are used to determine or generate an authentication signature for the new non-electronic physical object 150. To do so, the authentication compute device 102 may determine or sense any type and/or number of physical attributes of the non-electronic physical object 150. For example, in block 414, the authentication compute device 102 may sense an acoustic signature, or sound, of the non-electronic physical object 150 (e.g., the particular "ticking" sound of a mechanical watch). Additionally or alternatively, in block 416, the authentication compute device 102 may sense a color signature of the non-electronic physical object 150 (e.g., the particular coloring or color combination of a toy figurine). Additionally or alternatively, in block 418, the authentication compute device 102 may sense a shape signature of the non-electronic physical object 150 (e.g., the particular geometric shape of a rock). Additionally or alternatively, in block 420, the authentication compute device 102 may sense a weight signature of the non-electronic physical object 150 (e.g., the particular weight of pen). Additionally or alternatively, in block 422, the authentication compute device 102 may sense a position signature of the non-electronic physical object 150 (e.g., the particular positioning of a collectable coin in the key container 140). Additionally or alternatively, in block 424, the authentication compute device 102 may receive one or more user-defined physical attributes of the non-electronic physical object 150. Such user-defined physical attributes may be selected by the user from a graphical user interface or otherwise provided to the authentication compute device 102 by the user via a suitable mechanism.

Of course, in other embodiments, additional or other physical attributes of the new non-electronic physical object 150 may be used for the authentication signature. Additionally, it should be appreciated that a larger number of physical attributes used for the authentication signature may provide an increased level of security. It should also be appreciated that the particular physical attributes sensed or determined in block 412 may be dependent on the particular physical attribute sensors included in the physical attribute sensor array 120.

After the authentication compute device 102 has determined the particular physical attributes of the non-electronic physical object 150 in block 412, the method 400 advances to block 426 of FIG. 5. In block 426, the authentication compute device 102 determines or generates an authentication signature based on the physical attributes sensed or determined in block 412. As discussed above, the authentication signature may be embodied as, or otherwise indicative of, the individual determined physical attributes. For example, in embodiments in which multiple physical attributes are sensed in block 412, the authentication signature may be embodied as a set of those determined, multiple physical attributes.

In block 428, the authentication compute device 102 transmits the authentication signature to the remote server 106 via the network 108 for verification. As discussed above, the remote server 106 may verify the authentication signature has not been previously used by other users and/or by that particular user. For example, the remote server 106 may compare the particular physical attribute sensor data embodied as the authentication signature to corresponding sensor data of other authentication signatures to ensure no duplicate is present. In this way, the remote server 106 can verify that the new non-electronic physical object 150 has not been stolen or lost and is capable of being used as a unique or semi-unique security key as discussed above.

In block 430, the authentication compute device 102 determines whether the authentication signature has been verified and approved by the remote server 106. If not, the method 400 advances to block 432 in which the authentication compute device 102 generates an error notification in some embodiments. The authentication compute device 102 may generate any type of error notification including, but not limited to, an audible notification, a visual notification, and/or a tactile notification. In some embodiments, the error notification provides an indication to a user of the authentication compute device 102 that the non-electronic physical device 150 cannot be used as a security key. Regardless, after the error notification is generated in block 432 or if no error notification is generated, the method 400 loops back to block 402 of FIG. 4 in which the authentication compute device 102 determines whether the user would like to register a new non-electronic physical object 150.

Referring back to block 430, if the authentication compute device 102 determines that the authentication signature was verified by the remote server 106, the method 400 advances to block 434 in which the authentication compute device 102 determines an authentication action for that particular authentication signature of the non-electronic physical compute device 150. For example, in some embodiments, the authentication compute device 102 may receive one or more user-defined authentication actions in block 436. Alternatively, in block 438, the authentication compute device 102 may set a default authentication action for that particular authentication signature. As discussed above, the authentication action may include multiple actions in some embodiments, each of which may be embodied as any type of action capable of being performed by the authentication compute device 102 (e.g., providing access to the protected system 104, transmitting a notification to the server 106, generating an alert, etc.).

After the authentication compute device 102 has determined the authentication action of the present authentication signature in block 434, the method 400 advances to block 440. In block 440, the authentication compute device 102 stores the authentication action determined in block 434 in association with the particular authentication signature. For example, the authentication compute device 102 may store the authentication signature and corresponding authentication action in the authentication signature database 350. Additionally, the authentication compute device 102 may store a relationship between the corresponding authentication signature and authentication action to facilitate determination of which authentication actions are to be performed in response to a successful authentication with the corresponding authentication signature.

After the authentication compute device 102 has stored the authentication signature and authentication action in block 440, the method 400 loops back to block 402 of FIG. 4 in which the authentication compute device 102 determines whether the user would like to register a new non-electronic physical object 150. It should be appreciated that, in some embodiments, the same non-electronic physical object 150 may be used to generate multiple authentication signatures. In such embodiments, each authentication signature may be based on the same set of physical attributes, which have different values. For example, two authentication signatures may be dependent on the positioning of the non-electronic physical object 150 in the key container 140, on the present configuration of the non-electronic physical object 150 (e.g., is the cover a mechanical watch open or closed), or other physical attributes. In this way, a single non-electronic physical object 150 may be used to provide a multi-tier authorization for users and/or guest users.

Figure 6:
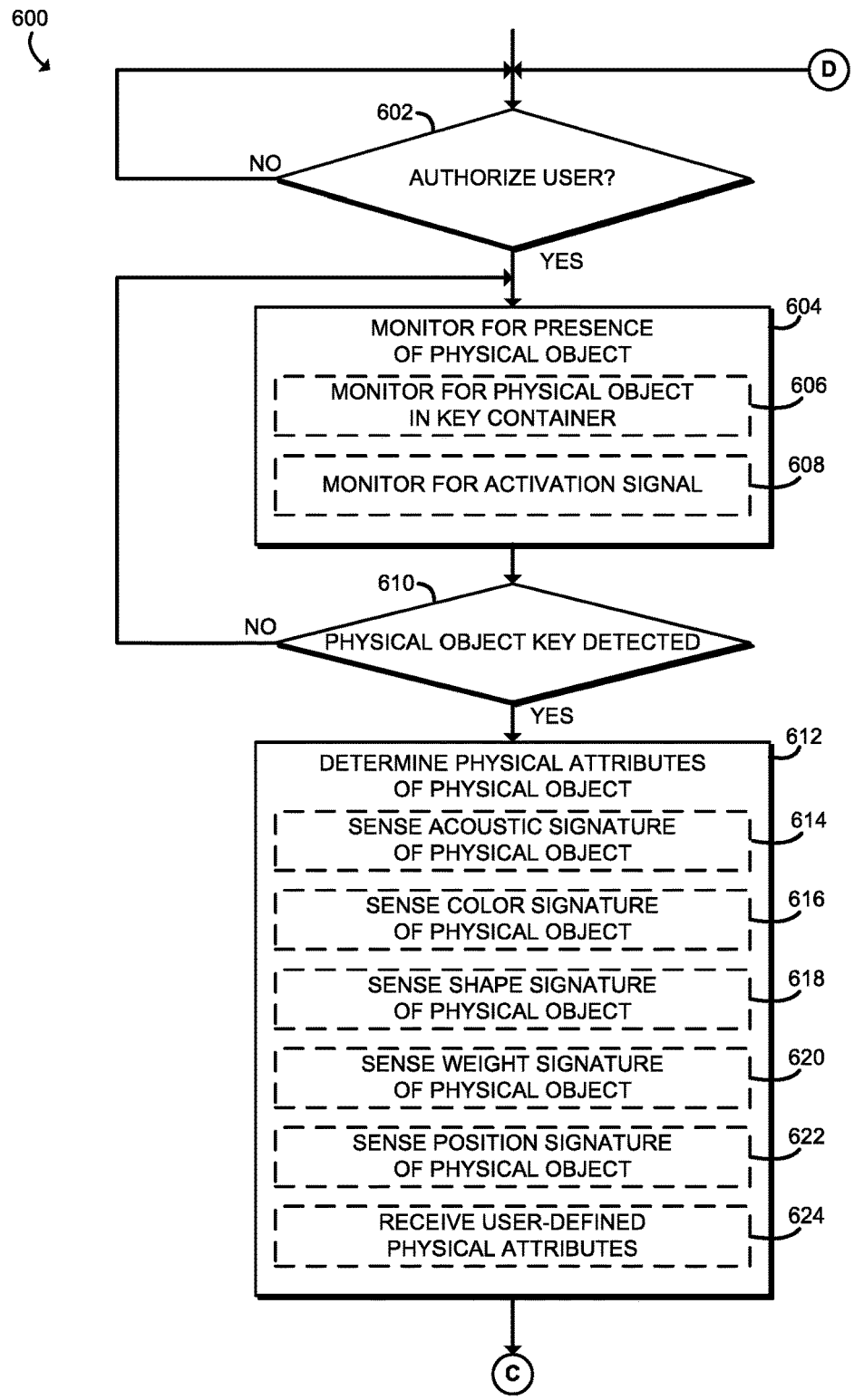
FIGS. 6-7 is a simplified flow diagram of at least one embodiment of a method for user authorization based on a non-electronic physical object security key that may be executed by the authentication compute device of FIGS. 1 and 3.
Figure 7:
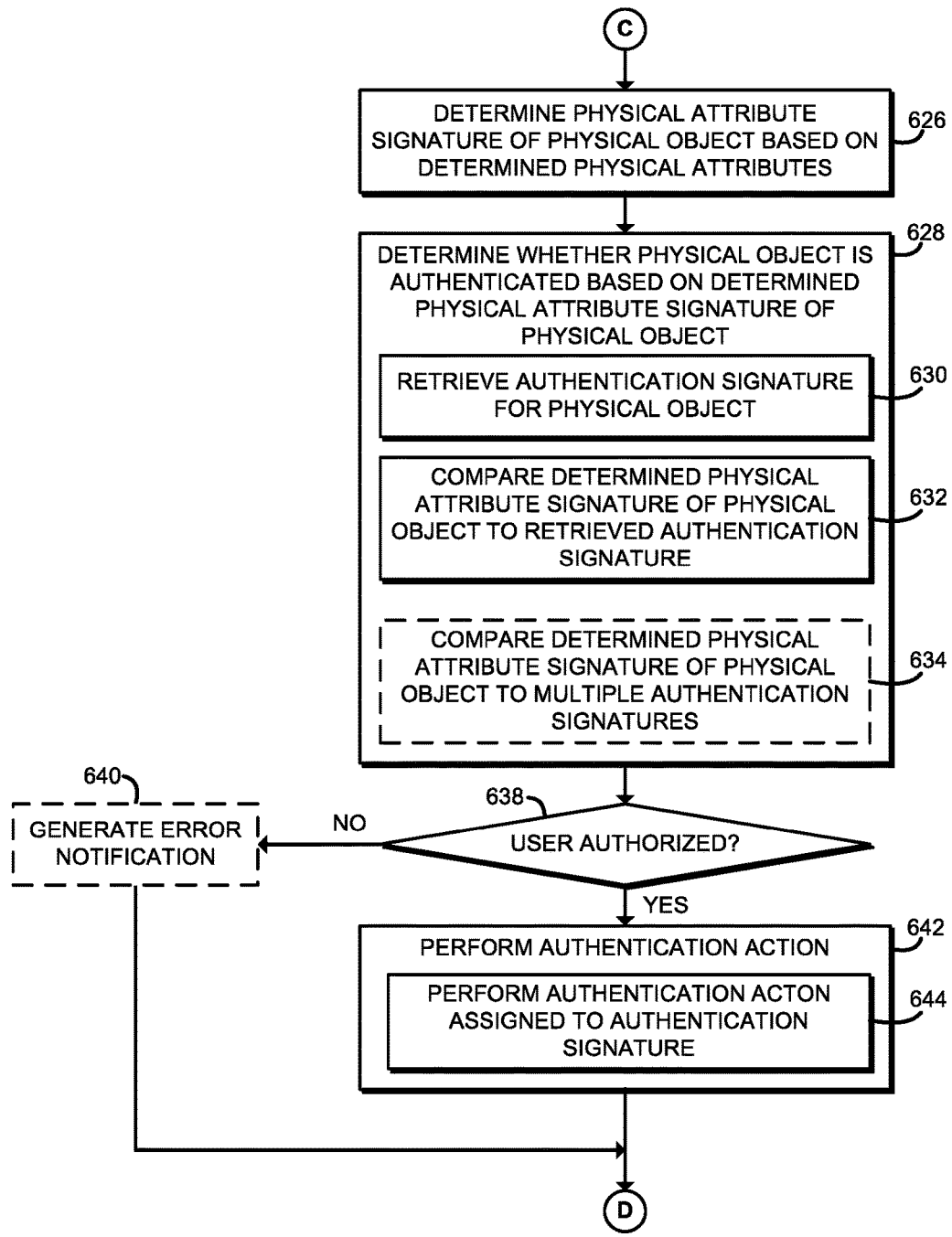

Referring now to FIGS. 6 and 7, in use, the authentication compute device 102 may execute a method 600 for user authorization based on a non-electronic physical object 150 as a security key. The method 600 begins with block 602 in which the authentication compute device 102 determines whether to authorize a user. To do so, in some embodiments, the user may provide an indication to the authentication compute device 102 that user authorization is desired. For example, the user may select an appropriate hardware or software button or widget to indicate a desire to authorize to the authentication compute device 102.

If the authentication compute device 102 determines that authentication is desired, the method 600 advances to block 604. In block 604, the authentication compute device 102 monitors for the presence of the physical object 150 in the local vicinity. To do so, as discussed above, the authentication compute device 102 may monitor sensor data produced from one or more physical attribute sensors of the physical attribute sensor array 120 and/or from dedicated presence sensors (e.g., motion sensors, image sensors, etc.). In embodiments in which the authentication compute device 102 and/or the protected system 104 includes the key container 140, the authentication compute device 102 may monitor for the presence of the non-electronic physical object 150 in the key container 140 in block 606. Additionally or alternatively, in block 608, the authentication compute device 102 may monitor for an activation signal that indicates the non-electronic physical object 150 is within the local vicinity (e.g., within the key container 140) as discussed above in regard to method 400.

In block 610, the authentication compute device 102 determines whether the non-electronic physical object 150 was detected. If not, the method 600 loops back to block 604 in which the authentication compute device 102 continues to monitor for the presence of the non-electronic physical object 150. If, however, the authentication compute device 102 successfully detected the non-electronic physical object 150, the method 600 advances to block 612. In block 612, the authentication compute device 102 determines the physical attributes of the non-electronic physical object 150. To do so, as discussed above, the authentication compute device 102 may determine or sense any type and/or number of physical attributes of the non-electronic physical object 150. For example, the authentication compute device 102 may sense an acoustic signature, or sound, of the non-electronic physical object 150 in block 614, a color signature of the non-electronic physical object 150 in block 616, a shape signature of the non-electronic physical object 150 in block 618, a weight signature of the non-electronic physical object 150 in block 620, and/or a position signature of the non-electronic physical object 150 in block 622. Additionally or alternatively, in block 624, the authentication compute device 102 may receive one or more user-defined physical attributes of the non-electronic physical object 150. Such user-defined physical attributes may be selected by the user from a graphical user interface or otherwise provided to the authentication compute device 102 by the user via a suitable mechanism. Of course, as discussed above, additional or other physical attributes of the non-electronic physical object 150 may be sensed or determined in other embodiments. Again, the particular physical attributes sensed or determined in block 412 may be dependent on the particular physical attribute sensors included in the physical attribute sensor array 120.

After the authentication compute device 102 has determined the particular physical attributes of the non-electronic physical object 150 in block 612, the method 600 advances to block 626 of FIG. 7. In block 626, the authentication compute device 102 determines or generates a physical attribute signature based on the physical attributes sensed or determined in block 612. Similar to the authentication signature discussed above in regard to method 400, the physical attribute signature may be embodied as, or otherwise indicative of, the individual physical attributes determined in block 612. For example, in embodiments in which multiple physical attributes are sensed in block 612, the physical attribute signature may be embodied as a set of those determined, multiple physical attributes (e.g., data indicative of the sense acoustics, color, shape, weight, and/or position of the non-electronic physical object 150).

Subsequently, in block 628, the authentication compute device 102 determines whether the non-electronic physical object 150 is authenticated based on the physical attribute signature determined in block 626. To do so, in block 630, the authentication compute device 102 retrieves an authentication signature for the non-electronic physical object 150. As discussed above, the authentication signature is embodied as, or otherwise indicative of, physical attributes of an authenticated non-electronic physical object 150. In block 632, the authentication compute device 102 compares the physical attribute signature determined in block 626 to the authentication signature received in block 630. To do so, the authentication compute device 102 may compare the sensor data embodied as the corresponding signatures to determine with the signatures match within a reference threshold of error. In embodiments in which multiple authentication signatures have been generated and stored by the authentication compute device 102, the authentication compute device 102 may compare the determined physical attribute signature to each of the authentication signatures in block 634.

In block 638, the authentication compute device 102 determines whether the user is authorized. That is, the authentication compute device 102 determines whether to authorize the user based on whether the physical attribute signature and the authentication signature match. If not, the method 600 advances to block 640 in which the authentication compute device 102 generates an error notification in some embodiments. The authentication compute device 102 may generate any type of error notification including, but not limited to, an audible notification, a visual notification, and/or a tactile notification. In some embodiments, the error notification provides an indication to a user of the authentication compute device 102 that the non-electronic physical object 150 was not authenticated. Regardless, after the error notification is generated in block 632 or if no error notification is generated, the method 600 loops back to block 602 of FIG. 6 in which the authentication compute device 102 again determines whether to authorize the user.

Referring back to block 638, if the authentication compute device 102 determines that the user is authorized based on the comparison of the determined physical attribute signature and the authentication signature, the method 600 advances to block 642. In block 642, the authentication compute device 102 performs an authentication action. For example, in block 644, the authentication compute device 102 performs an authentication action assigned to the authentication signature used to authorize the user. In other embodiments, a default authentication action may be performed in block 642. As discussed above, the authentication action may be embodied as any type of action capable of being performed by the authentication compute device 102 (e.g., providing access to the protected system, transmitting a notification to the server 106, generating an alert, etc.). Additionally, in some embodiments, multiple authentication actions may be performed in block 642 in response to the user being authorized. Regardless, after the authentication action(s) has been performed, the method 600 loops back to block 602 of FIG. 6 in which the authentication compute device 102 again determines user authorization is desired.

EXAMPLES

Illustrative examples of the technologies disclosed herein are provided below. An embodiment of the technologies may include any one or more, and any combination of, the examples described below.

Example 1 includes a compute device for user authorization. The compute device includes a physical object detector to monitor for the presence of a non-electronic physical object; and an authentication manager to (i) determine one or more physical attributes of the non-electronic physical object in response to a determination that the non-electronic physical object is present and (ii) authorize a user of the compute device based on the determined physical attributes of the non-electronic physical object.

Example 2 includes the subject matter of Example 1, and further including an audio sensor, and wherein to determine one or more physical attributes of the non-electronic physical object comprises to sense, by the audio sensor, an acoustic signature of the non-electronic physical object, wherein the acoustic signature defines one or more sounds generated by the non-electronic physical object.

Example 3 includes the subject matter of Example 1 or 2, and further including an image sensor, and wherein to determine one or more physical attributes of the non-electronic physical object comprises to sense, by the image sensor, a color signature of the non-electronic physical object, wherein the color signature defines a coloring of the non-electronic physical object.

Example 4 includes the subject matter of any of Examples 1-3, and further including a sensor, and wherein to determine one or more physical attributes of the non-electronic physical object comprises to sense, by the sensor, a shape signature of the non-electronic physical object, wherein the shape signature defines a shape of the non-electronic physical object.

Example 5 includes the subject matter of any of Examples 1-4, and further including a weight sensor, and wherein to determine one or more physical attributes of the non-electronic physical object comprises to sense, by the weight sensor, a weight signature of the non-electronic physical object, wherein the weight signature defines a weight of the non-electronic physical object.

Example 6 includes the subject matter of any of Examples 1-5, and further including a sensor, and wherein to determine one or more physical attributes of the non-electronic physical object comprises to sense, by the sensor, a position signature of the non-electronic physical object, wherein the position signature defines a positioning of the non-electronic physical object with respect to the compute device.

Example 7 includes the subject matter of any of Examples 1-6, and wherein to determine one or more physical attributes of the non-electronic physical object comprises to sense, by one or more sensors of the compute device, two or more of (i) an acoustic signature, (ii) a color signature, (iii) a shape signature, (iv) a weight signature, or (v) a position signature of the non-electronic physical object.

Example 8 includes the subject matter of any of Examples 1-7, and wherein to determine one or more physical attributes of the non-electronic physical object comprises to receive one or more user-defined physical attributes of the non-electronic physical object.

Example 9 includes the subject matter of any of Examples 1-8, and further comprising a physical container having one or more sensors, and wherein to monitor for the presence of the non-electronic physical object comprises to detect whether the non-electronic physical object is located in the physical container based on sensor data produced by the one or more sensors.

Example 10 includes the subject matter of any of Examples 1-9, and wherein to monitor for the presence of the non-electronic physical object comprises to detect the presence of the non-electronic physical object in response to receipt, by the compute device, of an activation signal.

Example 11 includes the subject matter of any of Examples 1-10, and wherein the authentication manager is further to determine a physical attribute signature based on the determined one or more physical attributes of the non-electronic physical object, and wherein to authorize the user of the compute device based on the determined physical attributes of the non-electronic physical object comprises to compare the determined physical attribute signature with an authentication signature of the non-electronic physical object, wherein the authentication signature is indicative of one or more previously determined physical attributes of a non-electronic physical object.

Example 12 includes the subject matter of any of Examples 1-11, and wherein to compare the determined physical attribute signature with the authentication signature comprises to compare the determined physical attribute signature with multiple authentication signatures of the non-electronic physical object, wherein each authentication signature defines a different set of previously determined physical attributes of the non-electronic physical object.

Example 13 includes the subject matter of any of Examples 1-12, and further including an authentication response manager to perform, in response to authentication of the user, an authentication action previously associated with the authentication signature.

Example 14 includes the subject matter of any of Examples 1-13, and further including an authentication response manager to perform, in response to authentication of the user, an authentication action.

Example 15 includes the subject matter of any of Examples 1-14, and further including a physical object registration manager to (i) generate an authentication signature of the non-electronic physical object based on the determined one or more physical attributes, wherein the authentication signature is indicative of the determined one or more determined physical attributes of the non-electronic physical object, and (ii) store the generated authentication signature.

Example 16 includes the subject matter of any of Examples 1-15, and further including an authentication response manager to (i) determine an authentication action to be performed by the compute device in response to authentication of the user via the generated authentication signature and (ii) store the authentication action in association with the authentication signature.

Example 17 includes a method for user authentication. The method includes monitoring, by a compute device, for the presence of a non-electronic physical object; determining, by the compute device and in response to a determination that the non-electronic physical object is present, one or more physical attributes of the non-electronic physical object; and authenticating, by the compute device, a user of the compute device based on the determined physical attributes of the non-electronic physical object.

Example 18 includes the subject matter of claim 17, and wherein determining one or more physical attributes of the non-electronic physical object comprises sensing, by an audio sensor of the computing device, an acoustic signature of the non-electronic physical object, wherein the acoustic signature defines one or more sounds generated by the non-electronic physical object.

Example 19 includes the subject matter of 17 or 18, and wherein determining one or more physical attributes of the non-electronic physical object comprises sensing, by an image sensor of the computing device, a color signature of the non-electronic physical object, wherein the color signature defines a coloring of the non-electronic physical object.

Example 20 includes the subject matter of any of claims 17-19, and wherein determining one or more physical attributes of the non-electronic physical object comprises sensing, by a sensor of the computing device, a shape signature of the non-electronic physical object, wherein the shape signature defines a shape of the non-electronic physical object.

Example 21 includes the subject matter of any of claims 17-20, and wherein determining one or more physical attributes of the non-electronic physical object comprises sensing, by a weight sensor of the computing device, a weight signature of the non-electronic physical object, wherein the weight signature defines a weight of the non-electronic physical object.

Example 22 includes the subject matter of any of claims 17-21, and wherein determining one or more physical attributes of the non-electronic physical object comprises sensing, by a sensor of the computing device, a position signature of the non-electronic physical object, wherein the position signature defines a positioning of the non-electronic physical object with respect to the compute device.

Example 23 includes the subject matter of any of claims 17-22, and wherein determining one or more physical attributes of the non-electronic physical object comprises sensing, by one or more sensors of the compute device, two or more of (i) an acoustic signature, (ii) a color signature, (iii) a shape signature, (iv) a weight signature, or (v) a position signature of the non-electronic physical object.

Example 24 includes the subject matter of any of claims 17-23, and wherein determining one or more physical attributes of the non-electronic physical object comprises receiving one or more user-defined physical attributes of the non-electronic physical object.

Example 25 includes the subject matter of any of claims 17-24, and wherein monitoring for the presence of the non-electronic physical object comprises detecting whether the non-electronic physical object is located in a physical container monitored by the compute device.

Example 26 includes the subject matter of any of claims 17-25, and wherein monitoring for the presence of the non-electronic physical object comprises detecting the presence of the non-electronic physical object in response to receipt, by the compute device, of an activation signal.

Example 27 includes the subject matter of any of claims 17-26, and further including determining, by the compute device, a physical attribute signature based on the determined one or more physical attributes of the non-electronic physical object, and wherein authenticating the user of the compute device based on the determined physical attributes of the non-electronic physical object comprises comparing the determined physical attribute signature with an authentication signature of the non-electronic physical object, wherein the authentication signature is indicative of one or more previously determined physical attributes of a non-electronic physical object.

Example 28 includes the subject matter of any of claims 17-27, and wherein comparing the determined physical attribute signature with the authentication signature comprises comparing the determined physical attribute signature with multiple authentication signatures of the non-electronic physical object, wherein each authentication signature defines a different set of previously determined physical attributes of the non-electronic physical object.

Example 29 includes the subject matter of any of claims 17-28, and further including performing, by the compute device and in response to authentication of the user, an authentication action previously associated with the authentication signature.

Example 30 includes the subject matter of any of claims 17-29, and further including performing, by the compute device and in response to authentication of the user, an authentication action.

Example 31 includes the subject matter of any of claims 17-30, and further including generating, by the compute device, an authentication signature of the non-electronic physical object based on the determined one or more physical attributes, wherein the authentication signature is indicative of the determined one or more determined physical attributes of the non-electronic physical object; and storing, by the compute device, the generated authentication signature.

Example 32 includes the subject matter of any of claims 17-31, and further including determining, by the compute device, an authentication action to be performed by the compute device in response to authentication of the user via the generated authentication signature; and storing the authentication action in association with the authentication signature.

Example 33 includes one or more machine-readable storage media comprising a plurality of instructions stored thereon that, when executed, cause a compute device to perform the method of any of Examples 17-32.

Example 34 includes a compute device for user authorization. The compute device includes means for monitoring for the presence of a non-electronic physical object; means for determining, in response to a determination that the non-electronic physical object is present, one or more physical attributes of the non-electronic physical object; and means for authenticating a user of the compute device based on the determined physical attributes of the non-electronic physical object.

Example 35 includes the subject matter of Example 34, and wherein the means for determining one or more physical attributes of the non-electronic physical object comprises means for sensing an acoustic signature of the non-electronic physical object, wherein the acoustic signature defines one or more sounds generated by the non-electronic physical object.

Example 36 includes the subject matter of Example 34 or 35, and wherein the means for determining one or more physical attributes of the non-electronic physical object comprises means for sensing a color signature of the non-electronic physical object, wherein the color signature defines a coloring of the non-electronic physical object.

Example 37 includes the subject matter of any of Examples 34-36, and wherein the means for determining one or more physical attributes of the non-electronic physical object comprises means for sensing a shape signature of the non-electronic physical object, wherein the shape signature defines a shape of the non-electronic physical object.

Example 38 includes the subject matter of any of Examples 34-37, and wherein the means for determining one or more physical attributes of the non-electronic physical object comprises means for sensing a weight signature of the non-electronic physical object, wherein the weight signature defines a weight of the non-electronic physical object.

Example 39 includes the subject matter of any of Examples 34-38, and wherein the means for determining one or more physical attributes of the non-electronic physical object comprises means for sensing a position signature of the non-electronic physical object, wherein the position signature defines a positioning of the non-electronic physical object with respect to the compute device.

Example 40 includes the subject matter of any of Examples 34-39, and wherein the means for determining one or more physical attributes of the non-electronic physical object comprises means for sensing two or more of (i) an acoustic signature, (ii) a color signature, (iii) a shape signature, (iv) a weight signature, or (v) a position signature of the non-electronic physical object.

Example 41 includes the subject matter of any of Examples 34-40, and wherein the means for determining one or more physical attributes of the non-electronic physical object comprises means for receiving one or more user-defined physical attributes of the non-electronic physical object.

Example 42 includes the subject matter of any of Examples 34-41, and wherein the means for monitoring for the presence of the non-electronic physical object comprises means for detecting whether the non-electronic physical object is located in a physical container monitored by the compute device.

Example 43 includes the subject matter of any of Examples 34-42, and wherein the means for monitoring for the presence of the non-electronic physical object comprises means for detecting the presence of the non-electronic physical object in response to receipt, by the compute device, of an activation signal.

Example 44 includes the subject matter of any of Examples 34-43, and further comprising means for determining a physical attribute signature based on the determined one or more physical attributes of the non-electronic physical object, and wherein the means for authenticating the user of the compute device based on the determined physical attributes of the non-electronic physical object comprises means for comparing the determined physical attribute signature with an authentication signature of the non-electronic physical object, wherein the authentication signature is indicative of one or more previously determined physical attributes of a non-electronic physical object.

Example 45 includes the subject matter of any of Examples 34-44, and wherein the means for comparing the determined physical attribute signature with the authentication signature comprises means for comparing the determined physical attribute signature with multiple authentication signatures of the non-electronic physical object, wherein each authentication signature defines a different set of previously determined physical attributes of the non-electronic physical object.

Example 46 includes the subject matter of any of Examples 34-45, and further comprising means for performing, in response to authentication of the user, an authentication action previously associated with the authentication signature.

Example 47 includes the subject matter of any of Examples 34-46, and further comprising means for performing, in response to authentication of the user, an authentication action.

Example 48 includes the subject matter of any of Examples 34-47, and further comprising means for generating an authentication signature of the non-electronic physical object based on the determined one or more physical attributes, wherein the authentication signature is indicative of the determined one or more determined physical attributes of the non-electronic physical object; and means for storing the generated authentication signature.

Example 49 includes the subject matter of any of Examples 34-48, and further comprising means for determining an authentication action to be performed by the compute device in response to authentication of the user via the generated authentication signature; and means for storing the authentication action in association with the authentication signature.

The invention claimed is:

1. A compute device for user authorization, the compute device comprising:
an audio sensor;
a hardware physical object detector to monitor for the presence of a non-electronic physical object; and
a hardware authentication manager to (i) determine one or more physical attributes of the non-electronic physical object in response to a determination that the non-electronic physical object is present, wherein to determine the one or more physical attributes of the non-electronic physical object comprises to sense, by the audio sensor, an acoustic signature of the non-electronic physical object, wherein the acoustic signature defines one or more sounds generated by the non-electronic physical object, (ii) determine a physical attribute signature based on the determined one or more physical attributes of the non-electronic physical object, and (iii) authorize a user of the compute device based on the determined physical attributes of the non-electronic physical object;
wherein to authorize the user of the compute device based on the determined physical attributes of the non-electronic physical object comprises to compare the determined physical attribute signature with multiple authentication signatures of the non-electronic physical object, wherein each authentication signature is indicative of a different set of one or more previously determined physical attributes of the non-electronic physical object, and wherein each authentication signature is associated with a different authorization tier.

2. The compute device of claim 1, further comprising an image sensor, and
wherein to determine one or more physical attributes of the non-electronic physical object comprises to sense, by the image sensor, a color signature of the non-electronic physical object, wherein the color signature defines a coloring of the non-electronic physical object.

3. The compute device of claim 1, further comprising a sensor, and
wherein to determine one or more physical attributes of the non-electronic physical object comprises to sense, by the sensor, a shape signature of the non-electronic physical object, wherein the shape signature defines a shape of the non-electronic physical object.

4. The compute device of claim 1, further comprising a weight sensor, and
wherein to determine one or more physical attributes of the non-electronic physical object comprises to sense, by the weight sensor, a weight signature of the non-electronic physical object, wherein the weight signature defines a weight of the non-electronic physical object.

5. The compute device of claim 1, further comprising a sensor, and
wherein to determine one or more physical attributes of the non-electronic physical object comprises to sense, by the sensor, a position signature of the non-electronic physical object, wherein the position signature defines a positioning of the non-electronic physical object with respect to the compute device.

6. The compute device of claim 1, further comprising a physical container having one or more sensors, and
wherein to monitor for the presence of the non-electronic physical object comprises to detect whether the non-electronic physical object is located in the physical container based on sensor data produced by the one or more sensors.

7. A method for user authentication, the method comprising:
monitoring, by a compute device, for the presence of a non-electronic physical object;

determining, by the compute device and in response to a determination that the non-electronic physical object is present, one or more physical attributes of the non-electronic physical object, wherein determining the one or more physical attributes of the non-electronic physical object comprises sensing, by an audio sensor of the computing device, an acoustic signature of the non-electronic physical object, wherein the acoustic signature defines one or more sounds generated by the non-electronic physical object;

determining, by the compute device, a physical attribute signature based on the determined one or more physical attributes of the non-electronic physical object; and authenticating, by the compute device, a user of the compute device based on the determined physical attributes of the non-electronic physical object, wherein authenticating the user of the compute device based on the determined physical attributes of the non-electronic physical object comprises comparing the determined physical attribute signature with multiple authentication signatures of the non-electronic physical object, wherein each authentication signature is indicative of a different set of one or more previously determined physical attributes of the non-electronic physical object, and wherein each authentication signature is associated with a different authorization tier.

8. The method of claim 7, wherein determining one or more physical attributes of the non-electronic physical object comprises sensing, by an image sensor of the computing device, a color signature of the non-electronic physical object, wherein the color signature defines a coloring of the non-electronic physical object.

9. The method of claim 7, wherein determining one or more physical attributes of the non-electronic physical object comprises sensing, by a sensor of the computing device, a shape signature of the non-electronic physical object, wherein the shape signature defines a shape of the non-electronic physical object.

10. The method of claim 7, wherein determining one or more physical attributes of the non-electronic physical object comprises sensing, by a weight sensor of the computing device, a weight signature of the non-electronic physical object, wherein the weight signature defines a weight of the non-electronic physical object.

11. The method of claim 7, wherein determining one or more physical attributes of the non-electronic physical object comprises sensing, by a sensor of the computing device, a position signature of the non-electronic physical object, wherein the position signature defines a positioning of the non-electronic physical object with respect to the compute device, and wherein monitoring for the presence of the non-electronic physical object comprises detecting whether the non-electronic physical object is located in a physical container monitored by the compute device.

12. One or more non-transitory, machine-readable storage media comprising a plurality of instructions stored thereon that, when executed, cause a compute device to:

monitor for the presence of a non-electronic physical object;

determine, in response to a determination that the non-electronic physical object is present, one or more physical attributes of the non-electronic physical object, wherein to determine the one or more physical attributes of the non-electronic physical object comprises to sense, by an audio sensor of the computing device, an acoustic signature of the non-electronic physical object, wherein the acoustic signature defines one or more sounds generated by the non-electronic physical object;

determine a physical attribute signature based on the determined one or more physical attributes of the non-electronic physical object; and authenticate a user of the compute device based on the determined physical attributes of the non-electronic physical object, wherein to authenticate the user of the compute device based on the determined physical attributes of the non-electronic physical object comprises to compare the determined physical attribute signature with multiple authentication signatures of the non-electronic physical object, wherein each authentication signature is indicative of a different set of one or more previously determined physical attributes of the non-electronic physical object, and wherein each authentication signature is associated with a different authorization tier.

13. The one or more non-transitory, machine-readable storage media of claim 12, wherein to determine one or more physical attributes of the non-electronic physical object comprises to sense, by an image sensor of the computing device, a color signature of the non-electronic physical object, wherein the color signature defines a coloring of the non-electronic physical object.

14. The one or more non-transitory, machine-readable storage media of claim 12, wherein to determine one or more physical attributes of the non-electronic physical object comprises to sense, by a sensor of the computing device, a shape signature of the non-electronic physical object, wherein the shape signature defines a shape of the non-electronic physical object.

15. The one or more non-transitory, machine-readable storage media of claim 12, wherein to determine one or more physical attributes of the non-electronic physical object comprises to sense, by a weight sensor of the computing device, a weight signature of the non-electronic physical object, wherein the weight signature defines a weight of the non-electronic physical object.

16. The one or more non-transitory, machine-readable storage media of claim 12, wherein to determine one or more physical attributes of the non-electronic physical object comprises to sense, by a sensor of the computing device, a position signature of the non-electronic physical object, wherein the position signature defines a positioning of the non-electronic physical object with respect to the compute device, and wherein to monitor for the presence of the non-electronic physical object comprises to detect whether the non-electronic physical object is located in a physical container monitored by the compute device.

\* \* \* \* \*